United States Patent [19]

Nakabe

[11] 3,954,448

[45] May 4, 1976

[54] PROCESS FOR RECOVERING COBALT, COPPER, IRON, NICKEL AND ARSENIC

[75] Inventor: Sanai Nakabe, Yokohama, Japan

[73] Assignee: Sumitomo Metal Mining Co. Limited, Tokyo, Japan

[22] Filed: Jan. 28, 1975

[21] Appl. No.: 544,679

[52] U.S. Cl. .................................. 75/82; 75/74; 75/101 R; 75/117; 75/119; 75/115; 75/121
[51] Int. Cl.² ..................... C22B 1/06; C22B 23/04; C22B 15/00
[58] Field of Search ............. 75/74, 82, 101 R, 117, 75/119, 115

[56] References Cited
UNITED STATES PATENTS

| | | | |
|---|---|---|---|
| 3,544,306 | 12/1970 | McGauley | 75/72 |
| 3,616,331 | 10/1971 | O'Neill et al. | 75/82 X |
| 3,637,372 | 1/1972 | Mayor et al. | 75/101 R |
| 3,684,489 | 8/1972 | Emicke et al. | 75/115 X |
| 3,809,624 | 5/1974 | Kane et al. | 75/117 X |

*Primary Examiner*—G. Ozaki
*Attorney, Agent, or Firm*—Watson, Cole, Grindle & Watson

[57] ABSTRACT

A process for recovering cobalt as cobalt sulfate solution from cobaltiferous material comprising reducing and smelting oxidized cobaltiferous material rich in iron to extract cobalt as an alloy containing cobalt and iron, which is a neat alloy or an alloy dissolved in a matte, leaving most of the iron in the resultant slag as the first step; converting the cobalt and iron in the alloy into sulfate by treating the alloy, after granulating the pure alloy or pulverizing the mixture of alloy and matte, with copper sulfate and water as the second step; and calcining the resultant mixture containing the sulfates to decompose the iron sulfate selectively into oxide, leaching the resultant calcine to extract cobalt as cobalt sulfate solution, and leaving iron as leach residue as the third step.

15 Claims, No Drawings

PROCESS FOR RECOVERING COBALT, COPPER, IRON, NICKEL AND ARSENIC

DETAILED DESCRIPTION OF THE INVENTION

Cobalt is produced naturally sometimes as a minor constituent in copper ore. It is sometimes recovered as cobalt concentrate through differential floatation; but its economical recovery is often difficult, and it is wasted along with iron as copper smelting slag.

A part of the cobalt is extracted into matte in copper smelting, extracted into converter slag along with iron, and reverted to the primary smelting; and it is eventually wasted as the slag from the primary smelting. An example of commercial extraction of cobalt is well-known whereby a slag as rich as 5 to 10% Co was produced which was smelted under reducing conditions, to recover an alloy containing 15% Cu, 40% Co, and 45% Fe; but the slag was produced from copper concentrate and cobalt concentrate of especially high cobalt grade such as 0.7% Co and 2.8% Co respectively, for example; and recovery of cobalt was very low, for slags as rich as 0.46% Co and 0.77% Co, for example, had to be wasted in large amounts.

The high grade cobaltiferous alloy was dissolved, in the example, with sulfuric acid, iron was eliminated as voluminous precipitate by neutralization, and cobalt was finally recovered through precipitation. However, when cobalt is to be recovered from a cobaltiferous material of low cobalt grade it is quite uneconomical commercially to eliminate iron that is nearly five times as prevalent as cobalt by such a process.

It is a conventional commercial operation to sulfatizing-roast a cobalt concentrate, which has been separated from a cobatiferous copper ore, for example, and to extract cobalt sulfate as a leach solution. Iron can be converted into an oxide while cobalt is converted into a sulfate through sulfatizing-roasting, and iron can easily be separated from the cobalt by leaching. However, cobalt cannot be sulfatized through sulfatizing-roasting of an alloy. Besides, cobalt concentrate usually contains still a large amount of copper which is leached out along with cobalt as sulfate. The copper is separated and extracted through electrowinning or precipitation by neutralization, but this is more expensive than extraction of copper through the ordinary smelting process for electrowinning consumes a large amount of power and the copper precipitate formed by neutralization is highly hydrated and is expensive to smelt. Thus, this is a large burden to the economy of cobalt recovery, for a far larger amount of copper is usually associated with cobalt.

Cobalt is produced naturally in a small amount often accompanied by nickel, but it is partly wasted as slag along with iron in nickel smelting. Recovery of cobalt from such slag is as difficult as from copper smelting slag.

Ores containing nickel or copper besides cobalt, asbolite or manganese nodule, for example, are left unutilized. It is proposed to treat manganese nodule, for example, by preferential reducing-smelting and to recover cobalt, nickel and copper as an alloy; but the alloy would contain also a large amount of iron which is very expensive to eliminate through hydrometallurgical means as already has been explained with respect to cobaltiferous alloy.

Cobalt is also produced naturally as arsenide. Extraction of cobalt from arsenide mineral through elimination of arsenic by roasting is another difficult problem in extractive metallurgy; and it is not sufficiently solved yet although many processes have been proposed, for they are expensive. A process for vaporizing arsenic with chlorine is being operated commercially, but it is expensive. It is well-known that arsenic can be easily eliminated when the arsenide is smelted along with a large amount of a sulfide ore, but this would dilute the cobalt with a large amount of iron and/or copper. This is hardly economical unless some means for separating cobalt from a large amount of iron and/or copper is provided.

Accordingly, it is the general object of this invention to provide a process for separating and extracting cobalt economically from material containing cobalt of low grade, thereby solving the previously noted difficulties.

It is another object of this invention to provide a process for extracting cobalt from material containing a large amount of iron.

It is a further object of this invention to provide a process for extracting cobalt from material containing copper and a large amount of iron, especially copper smelting slag.

It is a still further object of this invention to provide a process for extracting cobalt from material containing nickel.

It is a still further object of this invention to provide a process for extracting cobalt from nickel smelting slag.

It is a still further object of this invention to provide a process for extracting cobalt from material containing arsenic, especially in a large amount.

It is still further object of this invention to provide a process for recovering cobalt as a byproduct of copper smelting.

Generally stated, the present invention is a process for recovering cobalt from a cobaltiferous material comprising smelting under reducing conditions oxidized cobaltiferous material which is rich in iron to extract cobalt as an alloy, neat or dissolved in matte, through reduction of oxidized cobalt in preference to oxidized iron into metal; converting the cobalt and iron in the alloy into sulfates by treating the alloy with copper sulfate and water; calcining the resultant mixture containing the sulfates to decompose the iron sulfate selectively into an oxide; leaching the resultant calcine to extract cobalt as a cobalt sulfate solution; and leaving iron as leached residue.

This invention will be described now in more detail.

It is desirable to extract cobalt with a minimum of iron entering into an alloy with the cobalt when smelting an oxidized cobaltiferous material which is rich in iron, such as a cobaltiferous copper smelting slag, under reducing conditions. However, it is difficult to prevent some of the iron, usually in an amount greater than the cobalt, from entering into the alloy so that the major portion of the cobalt may be recovered.

Copper or nickel can, but cobalt cannot, be separated effectively from a large amount of iron as matte during smelting of raw materials. An even larger proportion of the iron enters the matte than enters the alloy if the cobalt is extracted as matte. Therefore, while it is necessary to extract colbalt as an alloy; it has been found that cobalt can be extracted from an alloy dissolved in the matte as effectively as into a neat alloy, according to the study of the inventor.

Accordingly, cobalt is extracted as a pure alloy or an alloy dissolved in matte from an oxidized cobaltiferous material rich in iron as the first step of the present process.

Since production of a pure alloy, through smelting of an oxidized cobaltiferous material with addition of a limited amount of reductant, for example, is a well-known process, the explanation to follow is given with regard to production of an alloy dissolved in matte metallic A copper smelting process is usually an oxidizing process and the resultant matte consists, especially when it is rich in iron, of sulfides and oxides and does not contain metallic iron. However, under more reducing conditions, a matte can be produced that contains metallic iron and metallic cobalt to a considerable extent. Therefore, molten converter slag may be fed onto a bath of molten copper matte with the addition of a reductant, carbon and/or metallic iron, for example, with heating and agitation. The heat may be applied electrically or chemically such as by the addition of calcium carbide or ferro silicide when other reductants may be dispensed with. The magnetite and oxidized cobalt in the slag, and a part of the ferrous oxide depending on the case, are reduced and the resulting metallic cobalt and metallic iron are dissolved into the bath of matte. Since the amount of alloy extracted from a batch of slag is small, the treated slag is discharged in order to similarly treat the next batch of slag. This slag treatment is repeated as desired to accumulate a suitable supply of treated slag. However, it is also desirable to stop the treatment before the saturation limit for the metallic iron and metallic cobalt in the matte is reached.

The alloy dissolved in the matte can be separated by carburizing the mixture in the molten state, such as by pouring the mixture through a column of red hot lump coke, the pure alloy settles to the bottom while the mother matte stays at the top. The alloy contains most of the cobalt from the original mixture while the mother matte most of the copper, and the latter may be reverted to the treatment of the slag or to the converter to be bessemerized to extract copper as metal and cobalt as slag again.

The pure alloy produced by any of the above mentioned procedures is granulated, such as by running into water. The excess, a far larger amount than is required for the reaction, is treated with copper sulfate and a small amount of water in a tumbler or similar means to convert the metallic cobalt and the metallic iron in the alloy into sulfates and the copper in the copper sulfate into cement copper. The resulting slurry then is separated from the remnant alloy which is further treated in the following batches.

The resulting slurry is filtered, for example, to separate the cement copper. The resulting filtrate contains sulfates which may be evaporated, and the resulting mixture of sulfates may be calcined by well-known means so that the iron sulfate is decomposed into iron oxide while the cobalt surface remains intact. The calcine may be leached with water, for example, and the cobalt is extracted as cobalt sulfate solution while the iron is separated as leach residue.

Alternatively, the solution containing sulfates of cobalt and iron may be roasted along with ore containing a large amount of iron sulfide for evaporation of water and calcining of the mixed sulfates. This operation may be combined with recovery of cobalt from cobaltiferous pyrite by roasting and leaching.

The copper sulfate for treating the alloy can be used as a concentrated solution, for example, a solution obtained following the roasting and leaching of a concentrated copper sulfide ore. Since cobaltiferous pyrite concentrate often contains a considerable amount of copper, the copper obtained by roasting and leaching can be used advantageously as a part of the copper sulfate.

The alloy which is dissolved in the matte becomes brittle on cooling and can be comminuted and is treated with nearly the stoichiometric amount of copper sulfate for the cobalt and iron in the alloy along with a small amount of water. The resulting slurry may be filtered, and the filtrate may be treated similarly to the treatment of the solution of sulfates.

The solution of cobalt sulfate produced by the present process contains a small amount of iron, and it contains also copper if it is produced by roasting and leaching along with cupriferous pyrite. The iron, or iron and copper, if any, may be precipitated, for example, with addition of milk of lime as a basic salt to be separated by filtration and the cobalt may be recovered by wellknown means.

The resulting precipitate of the basic salt of copper may be dissolved with sulfuric acid to form a copper sulfate solution which may be used for treating the alloy. It is desirable to use a small amount of sulfuric acid in order to enhance extraction of copper during leaching of a calcined cupriferous material. A part of the acid remains unconsumed in the resulting leach solution containing copper sulfate and the remaining acid may be utilized for dissolving the precipitate of the basic salt of copper.

The present process may be used in combination with a copper smelting process for recovering cobalt from the slag resulting from the smelting of cobaltiferous material along with cupriferous material. The intermediate cupriferous products produced from the present process, for example, the cement copper or the mother matte remaining after dissolving the accompanying alloy into aqueous solution, can easily be treated by simply returning them to the copper smelting process. The cobalt contained in the intermediate products can be extracted by applying the present process again to the resulting copper smelting slag. Thus a high overall recovery of cobalt can be expected although the direct recovery of cobalt is low.

The present process can also be applied to a material containing cobalt and nickel along with a large amount of iron.

According to the present invention, nickel in the alloy can also be converted into nickel sulfate and extracted as a mixed solution of the sulfates of cobalt and nickel if copper is not contained in the alloy. Nickel is left as a leach residue from treating the alloy with copper sulfate and water if the alloy contains sufficient copper. This effects a separation of cobalt from nickel while the copper and nickel in the residue can be extracted as nickeliferous crude copper after smelting. Manganese nodule, for example, can be smelted under reducing conditions to extract cobalt, nickel and copper as an alloy and manganese as slag. The resulting alloy is treated to extract cobalt as a cobalt sulfate solution and nickel and copper in the leach residue.

The present process may also be applied in combination with a copper smelting process to treat a material containing cobalt and nickel and extract them separately. A material of low cobalt grade, for example, asbolite, manganese nodule or converter slag from nickel smelting, may be smelted along with cupriferous material to extract cobalt from the copper matte of the low grade cobalt material. A material of high cobalt grade, for example, a mixed sulfide, a mixed oxide, an ore or an alloy which may contain nickel and cobalt may preferably be smelted along with copper matte to extract cobalt, nickel and copper into matte. The resulting copper matte is bessemerized to extract most of the cobalt as slag which is treated by the present process and converted into a cobalt sulfate solution and most of the nickel to crude nickeliferous metallic copper which is electro-refined to recover nickel sulfate from the spent electrolyte.

The present process may also be applied in combination with a copper smelting process to a cobaltiferous material containing arsenic for recovering cobalt. Cobalt arsenide concentrate, for example, may be smelted along with a large amount of copper sulfide ore or copper matte and arsenic is eliminated as flue dust while copper is slagged off to be extracted by the present process from the slag. A small part of the arsenic is extracted initially as slag and hence as an alloy, but it is eliminated as flue dust eventually after the leach residue from the alloy treatment is reverted to the copper smelting process.

As has been explained, it is one of the advantages of the present process that a large amount of iron accompanying the desired cobalt can easily be eliminated. This is achieved under the process of the present invention by the combination of the two steps: (1) the extraction of cobalt as an alloy resulting in a more efficient elimination of iron than as a matte; and (2) the selective thermal decomposition of the iron sulfate. A large amount of sulfuric acid is not required for the conversion of the cobalt and iron in the alloy into sulfates by the present process. The iron oxide formed by the thermal decomposition of the iron sulfate is not hydrated, is of a small volume relative to the ordinary iron precipitate formed by neutralization in solution, and is easy to filter.

It is another advantage of the present invention that the copper in a cobalt concentrate can easily be recovered by treating the cobaltiferous alloy by the present process in combination with the treatment of a concentrated copper sulfide ore containing iron sulfide and copper sulfide. Most of the copper is extracted as cement copper of high grade and of a small volume which may be economically smelted for its recovery. This is achieved through utilization of the metallic iron in the alloy to be wasted.

It is a further advantage that the cost of recovering cobalt is improved greatly by the present process through production of the copper sulfate solution required for treating the alloy from concentrated copper sulfide ore by sulfatizing roasting and leaching. This saves not only the cost of treating the alloy but also enables one to extract copper from copper ore inexpensively as a byproduct of cobalt extraction.

It is a still further advantage that cobalt associated with nickel can be separated therefrom and recovered. It can be recovered from the slag of copper smelting or nickel and copper smelting as a byproduct.

It is a still further advantage that cobalt associated with a large amount of arsenic can be recovered as a byproduct of copper smelting.

It is a still further advantage that cobalt can be recovered collectively from several minor sources as a byproduct of copper smelting. Cobalt is often produced naturally on a small scale as materials of various compositions each of which must have hitherto been treated by a different one of various processes resulting in high cost, also many of these materials have been left unutilized. However, the present process enables one to treat these materials and the intermediate products therefrom collectively on a large scale thereby significantly lowering the cost.

It is a still further advantage that the cost for reducing-smelting for production of a cobaltiferous alloy is saved through treating molten slag with a combined process consisting of the present process and conventional copper smelting. Especially, extraction of cobalt as an alloy dissolved in a matte enables one to treat the slag at a lower temperature than as a neat alloy.

This invention will be further illustrated by way of the following examples.

EXAMPLE 1

A cobaltiferous slag from a copper converter was pulverized into a particle size of less than 3 mm and melted in an electric furnace with the addition of powdered coke.

The resulting alloy was crushed to a particle size ranging from 1 to 2 cm and was mixed with cupric sulfate and water. The mixture was treated in a tumbler for one hour. The resulting slurry was discharged from the tumbler and was filtered. The filter cake and the remnant alloy were then washed with water.

The filtrate and wash solution were combined and evaporated to dryness. The resulting mixed sulfates were heated in an electric furnace at about 600°C for 30 minutes. The calcined product was leached with water, filtered and the residue was washed with water to separate a solution of cobalt sulfate from the residue. The compositions of the feeds and products are shown in Tables 1 to 3.

Table 1

| Material | Smelting process | | | | | |
| | Amount (Kg) | Composition, weight % | | | | |
| | | Cu | Co | Fe | SiO$_2$ | Co/Fe |
| --- | --- | --- | --- | --- | --- | --- |
| Slag from converter | 10 | 4.5 | 2.7 | 53.2 | 22.6 | 1/19 |
| Powdered coke | 0.5 | | | | | |
| Alloy | 2 | 18.6 | 11.6 | 58.1 | | 1/5 |
| Discharged slag | 7 | 0.6 | 0.4 | 50.8 | | 1/127 |

Table 2

| Material | Tumbling process Amount | Composition, weight % | | | | |
|---|---|---|---|---|---|---|
| | | Cu | Co | Fe | SiO$_2$ | Co/Fe |
| Alloy | 1,200g | 18.6 | 11.6 | 58.1 | | 1/5 |
| Blue vitriol | 300g | 24.8 | | | | |
| Water | 400cc | | | | | |
| Precipitated copper | 125g | 73.6 | 1.2 | 11.2 | | |
| Remnant alloy | 1,070g | | | | | |
| Solution | 1,000cc | Trace | 11.9 | 58.2 | | 1/5 |

Table 3

| Material | Calcining and leaching process Amount | Composition, weight % | | | | |
|---|---|---|---|---|---|---|
| | | Cu | Co | Fe | SiO$_2$ | Co/Fe |
| Charged solution | 800cc | Trace | 11.9 | 58.2 | | 1/5 |
| Mixed sulfates | 160g | | | | | |
| Calcined product | 90g | | | | | |
| Water | 250cc | | | | | |
| Co sulfate solution | 250cc | Trace | 32.6 | 2.0 | | 1/0.06 |
| Leached residue | 72g | Trace | 1.1 | 60.3 | | 1/55 |

The yields in each step were calculated from these results and the overall yield was calculated as 58%. Since iron was contained in the final solution in an amount of only 1.9%, it is obvious that the intended separation of the iron from the cobalt has been achieved. Because of the small scale run with much handling loss, the yield of cobalt is unduly small. However, the total amount of the cobalt in the discharged slag as shown in Table 1 and in the precipitated copper as shown in Table 2 amounted to 19% of that in the feed. This shows the importance of combining the present process with copper smelting in order to treat these intermediate products in copper smelting to reclaim cobalt.

EXAMPLE 2

A molten copper matte was kept in a ladle and a molten slag containing cobalt from a converter was poured onto the matte bath. Calcium carbide was added to the mixture in the ladle and was stirred by inserting green wood for 3 minutes. The slag was then discharged. These operations were repeated 10 times by charging fresh slag from the converter after discharging the treated slag. The discharged temperature of resulting slag was about 1300°C.

A portion of the resulting mixture of matte and alloy was percolated through a column of red-hot lump coke heaped to a height of about 2 meters and the operation was repeated three times by recycling the discharged mixture.

The treated mixture was poured into a number of crucibles. After cooling, the contents in each of the crucibles was separated into the tops and bottoms by impact. The bottoms were combined, remelted and then granulated by pouring the melt into deep water.

The alloy grains having a size from 1 to 2 cm were treated in a similar procedure as that which is disclosed in Example 1. The resulting filtrate was added to a cobaltiferous sulfide concentrate and the mixture was heated to dry it, followed by roasting at about 600°C in a tilting rotary tube. The calcined product after being discharged from the tube was repeatedly recharged into the tube until substantially no sulfur dioxide was liberated. The final calcined product was leached with water and filtered. The residue was leached with a dilute sulfuric acid and then filtered. The residue was washed with water.

The leach solution and the wash solution were combined and added with milk of lime to precipitate the copper and iron. The resulting slurry was filtered to obtain a cobalt sulfate solution.

The precipitated copper and iron were dissolved in the acid-leach solution with the addition of a small amount of sulfuric acid to produce a cupric sulfate solution. The cupric sulfate solution was used as a part of the cupric sulfate necessary for the next tumbling process. Tables 4 to 7 show the amounts and compositions of the feeds and products.

Table 4

| Material | Smelting process Amount (kg) | Composition, weight % | | | | | |
|---|---|---|---|---|---|---|---|
| | | Cu | Co | Fe | S | C | Co/Fe |
| Copper matte | 1,300 | 39.2 | 0.7 | 31.1 | 20.3 | | 1/45 |
| Slag from converter | 10,000 | 4.0 | 0.9 | 54.4 | 2.1 | | 1/61 |
| Carbide | 250 | | | | | | |
| Produced mixture | 1,800 | 43.8 | 3.7 | 31.6 | 17.4 | | 1/8.6 |
| Discharged slag | 9,500 | 1.1 | 0.3 | 52.6 | 1.3 | | 1/175 |
| Treated mixture | 1,000 | 43.8 | 3.7 | 31.6 | 17.4 | | 1/8.6 |
| Top | 700 | 57.2 | 0.6 | 15.9 | 23.7 | | 1/27 |
| Bottom | 260 | 8.7 | 11.6 | 70.8 | 0.9 | 2.5 | 1/6 |

Table 5

| Material | Tumbling process Amount | Composition, weight % or g/l | | | |
|---|---|---|---|---|---|
| | | Cu | Co | Fe | Co/Fe |
| Granulated alloy | 1,200g | 8.7 | 11.6 | 70.8 | 1/6 |
| Blue vitriol | 300g | 24.8 | | | |
| Water | 400cc | | | | |
| Precipitated copper | 110g | 70.6 | 1.3 | 13.2 | |
| Filtrate | 350cc | Trace | 23.0 | 126.5 | 1/5.5 |
| Wash solution | 200cc | | 8.2 | 45.6 | 1/5.5 |
| Remnant alloy | 1,100g | | | | |

Table 6

| Material | Roasting process Amount | Composition, weight % or g/l | | | | |
|---|---|---|---|---|---|---|
| | | Cu | Co | Fe | S | Co/Fe |
| Cobaltiferous sulfide concentrate | 300g | 6.8 | 3.8 | 28.1 | 32.2 | 1/7.4 |
| Filtrate | 300g | Trace | 23.0 | 126.5 | | 1/5.5 |
| Calcined product | 380g | | | | | |
| Water | 600cc | | | | | |
| Water leach solution | 500cc | 20.5 | 29.5 | 3.3 | | 1/0.1 |
| Sulfuric acid | 20g | | | | | |
| Acid leach solution | 200cc | 28.7 | 8.6 | 4.8 | | 1/0.6 |
| Wash solution | 500cc | 7.1 | 1.8 | 1.3 | | 1/0.8 |
| Residue | 270g | 0.2 | 0.2 | 42.7 | | 1/214 |

Table 7

| Material | Treating step of leached liquor Amount | Composition, weight % or g/l | | | |
|---|---|---|---|---|---|
| | | Cu | Co | Fe | Co/Fe |
| Water leach solution | 400cc | 20.5 | 29.5 | 3.3 | 1/0.1 |
| Wash solution | 400cc | 7.1 | 1.8 | 1.3 | |
| Ca(OH)$_2$ | 14g | | | | |
| Co sulfate solution | 800cc | 2.2 | 14.6 | 0.2 | 1/0.01 |
| Cake of Cu and Fe precipitate | | 6.4 | 0.7 | 1.4 | 1/2 |
| Produced | 175g | | | | |
| Treated | 150g | | | | |
| Acid leach solution | 140cc | 28.7 | 8.6 | 4.8 | 1/0.6 |
| Sulfuric acid | 5g | | | | |
| Cupric sulfate solution | 240cc | 53.9 | 8.8 | 11.0 | 1/1.2 |

These results show that the copper and cobalt content of the intermediate products such as the top as shown in Table 4 were much higher than in the case of the material of Example 1. Hence, the significance of this treating the intermediate prouducts by recycling is greater. It is obvious, therefore, that the intended separation of the cobalt from the iron and copper has been achieved.

EXAMPLE 3

A portion of the mixture of matte and alloy obtained by the reducing-smelting of converter slag in the Example 2 was cooled and was pulverized to such an extent that it passed through a 100 mesh screen. The pulverized mixture was mixed with copper sulfate and water and ground at about 70°C for 30 minutes in a mortar. Additional water was added to the ground mixture and was heated to 50°C under agitation, filtered and washed with water thereby obtaining a solution similar to the mixture of filtrate and wash solution produced by the tumbler treatment in Example 2. Table 8 shows the amounts and compositions of the feed and products. The filtrate and wash solution were treated in accordance with the procedure as disclosed in Example 2 to prepare a cobalt sulfate solution.

Table 8

| Material | Amount | Composition, weight % or g/l | | |
|---|---|---|---|---|
| | | Cu | Co | Fe |
| Mixture | 200cc | 43.8 | 3.7 | 31.6 |
| Blue vitriol | 215g | 24.8 | | |
| Water | 60cc | | | |
| Filtrate plus wash solution | 400cc | 2.6 | 14.2 | 98.7 |
| Residue | 220g | 62.9 | 0.7 | 10.2 |

EXAMPLE 4

A copper matte containing nickel and cobalt was melted in a tilting electric furnace with tuyeres and was bessemerized at about 1300°C with the addition of silica sand. When most of iron has been oxidized, the smelting operation was stopped and the contents were discharged. Table 9 shows the amounts and compositions of the feed and discharged products.

Table 9

| Material | Amount (kg) | Cu | Fe | Composition, weight % Co | Ni | S | SiO$_2$ | Co/Ni |
|---|---|---|---|---|---|---|---|---|
| Copper matte | 200 | 34.7 | 30.1 | 4.2 | 1.0 | 20.4 | | 4/1 |
| Silica sand | 20 | | | | | | | |
| White metal | 95 | 66.2 | 7.9 | 2.5 | 1.8 | 19.6 | | 1.4/1 |
| Slag | 97 | 3.8 | 50.5 | 5.5 | 0.2 | | 16.1 | 27/1 |

EXAMPLE 5

White metal having a composition similar to that obtained in Example 4 was melted in the same furnace as employed in Example 4 and was bessemerized at about 1250°C for about 50 minutes until the matte almost disappeared and the resulting slag was discharged. After the melt was bessemerized further for 5 minutes, the crude copper was discharged. Table 10 shows the amounts and compositions of the feeds and discharged products.

Table 10

| Material | Amount (kg) | Cu | Fe | Composition, weight % Co | Ni | S | SiO$_2$ | Co/Ni |
|---|---|---|---|---|---|---|---|---|
| White matte | 150 | 68.3 | 4.9 | 1.4 | 1.5 | 20.4 | | 0.9/1 |
| Silica sand | 5 | | | | | | | |
| Slag | 25 | 6.5 | 33.5 | 7.6 | 0.3 | | 29.7 | 40/1 |
| Blister copper | 105 | 95.1 | 0.4 | 0.1 | 1.7 | | | 0.06/1 |

EXAMPLE 6

The slag from the copper converter obtained in Example 4 and containing nickel and cobalt was trated in a procedure similar to that described in Example 1 to obtain precipitated copper, a cobalt sulfate solution and a residue containing mainly iron oxide. Tables 11 to 13 show the amounts and compositions of the feed and products in this operation.

Table 11

Smelting process

| Material | Amount (kg) | Cu | Fe | Co | Ni | SiO$_2$ | Co/Ni |
|---|---|---|---|---|---|---|---|
| Converter slag | 95 | 3.8 | 50.5 | 5.5 | 0.2 | 16.1 | 28/1 |
| Powdered coke | 6 | | | | | | |
| Alloy | 21 | 13.4 | 62.6 | 20.5 | 0.8 | | 26/1 |
| Discharged slag | 70 | 0.7 | 47.6 | 0.7 | Trace | | |

Table 12

Tumbling process

| Material | Amount | Cu | Fe | Co | Ni | Co/Ni |
|---|---|---|---|---|---|---|
| Alloy | 1,200g | 13.4 | 62.6 | 20.5 | 0.8 | 26/1 |
| Blue vitriol | 400g | 24.8 | | | | |
| Water | 400cc | | | | | |
| Precipitated Cu | 130g | 72.0 | 12.9 | 3.6 | 0.4 | 9/1 |
| Remnant alloy | 1,050g | | | | | |
| Solution | 1,200cc | Trace | 62.8 | 21.0 | 0.3 | 70/1 |

Table 13

| Material | Amount | Cu | Fe | Co | Ni | Co/Ni |
|---|---|---|---|---|---|---|
| Charged solution | 1,000cc | Trace | 62.8 | 21.0 | 0.3 | 70/1 |
| Sulfate mixture | 240g | | | | | |
| Calcined product | 150g | | | | | |
| Water | 400cc | | | | | |
| Co sulfate solution | 500cc | Trace | 0.9 | 38.6 | 0.5 | 77/1 |
| Residue after leaching | 95g | Trace | 62.5 | 1.7 | Trace | |

These results show that the separation of cobalt from nickel is insufficient in any one of the procedures as shown in Example 4, 5 and 6 individually; but, when these procedures are combined, a cobalt sulfate solution containing only a small amount of nickel can be prepared from a copper matte containing cobalt and nickel.

EXAMPLE 7

A cobalt arsenide concentrate and a copper matte were smelted in the same furnace as employed in Example 4 and the resulting mixture was bessemerized at about 1300°C with the addition of silica sand until most of iron was slagged off. Then the bessemerization was stopped and the contents were discharged. A small amount of the flue dust was taken as sample.

The slag was treated in the similar manner as the alloy was treated in Example 1. The removal of the arsenic was practically complete. Tables 14 and 15 show the amounts and compositions of the feeds and products.

Table 1

| Material | Amount (kg) | Smelting process Composition, weight % | | | | | |
|---|---|---|---|---|---|---|---|
| | | Cu | Fe | Co | S | As | SiO$_2$ |
| Copper matte | 100 | 36.9 | 32.2 | | 20.6 | | |
| Co Concentrate | 20 | | 9.2 | 10.6 | | 12.3 | |
| White metal | 48 | 67.0 | 5.2 | 1.2 | 20.6 | 0.5 | |
| Slag | 59 | 4.5 | 48.9 | 2.2 | | 0.3 | 26.2 |
| Flue dust | | | | | | 48.6 | |
| Powdered coke | 3 | | | | | | |
| Alloy | 10 | 21.4 | 58.7 | 10.9 | | 0.8 | |
| Discharged slag | 50 | 0.6 | 46.2 | 0.3 | | | 27.3 |

Table 15

| Material | Tumbling process Amount | Composition, weight % or g/l | | | |
|---|---|---|---|---|---|
| | | Cu | Fe | Co | As |
| Alloy | 1,200g | 21.4 | 58.7 | 10.9 | 0.8 |
| Blue vitriol | 300g | 24.8 | | | |
| Water | 400cc | | | | |
| Remnant alloy | 1,050g | | | | |
| Precipitated Cu | 135g | 68.9 | 12.2 | 1.1 | 0.7 |
| Solution | 1,000cc | (g/l) 0.2 | (g/l) 62.1 | (g/l) 10.8 | Trace |

What are claimed are:

1. A process for recovering cobalt from cobaltiferous material comprising reducing-smelting an oxidized material rich in iron to extract cobalt as an alloy through reduction of oxidized cobalt into metal in preference to oxidized iron; converting the cobalt and iron in the alloy into sulfates by treating the alloy with cupric sulfate and water; calcining the resulting mixture containing the sulfates to decompose the iron sulfate selectively into oxide, and leaching the resulting calcine with an aqueous medium to extract cobalt as a cobalt sulfate solution leaving iron as a leach residue.

2. A process according to claim 1, wherein said alloy is extracted as a pure alloy.

3. A process according to claim 1, wherein said alloy is extracted as an alloy dissolved in copper matte.

4. A process according to claim 3, wherein said alloy dissolved in matte is separated as a pure alloy by carburization in a molten state.

5. A process according to claim 3, wherein reducing-smelting is effected by addition of at least one material selected from the group consisting of metallic iron, carbon, calcium carbide and ferro-silicide to a molten bath containing copper matte and slag.

6. A process according to claim 5, wherein the bath is heated by exothermic reactions between calcium carbide and oxidized metals.

7. A process according to claim 5, wherein the bath is heated by exothermic reactions between ferro-silicide and oxidized metals.

8. A process according to claim 3, wherein said alloy dissolved in the matte is comminuted along with the matte.

9. A process of claim 1, wherein the cupric sulfate used is a concentrated aqueous solution obtained by sulfatizing-roasting copper sulfide ore and leaching.

10. A process according to claim 1, wherein the calcining of the mixture is effected by roasting the mixture along with ore or concentrate containing a large amount of iron sulfide.

11. A process according to claim 1, wherein the copper and nickel are left in the insoluble residue in treating the alloy with cupric sulfate and water while the cobalt in the alloy is dissolved and a separation of cobalt and nickel is effected.

12. A process according to claim 11, wherein cobalt is extracted as copper-rich matte which is bessemerized to extract cobalt as slag.

13. A process according to claim 11, wherein a material containing cobalt and nickel is treated and nickel is extracted as nickeliferous crude copper.

14. A process according to claim 1, wherein cobaltiferous material is smelted along with cupriferous material and cobalt is extracted from the slag produced in recovering copper, by reducing-smelting.

15. A process according to claim 1, wherein a material containing cobalt and arsenic is smelted along with cupriferous sulfide material and cobalt is extracted as slag while arsenic is eliminated as flue dust.

* * * * *